March 19, 1957 L. E. WELLS 2,786,090
ELECTROLYTE LEVEL CONTROL FOR A STORAGE BATTERY
Filed June 25, 1953

INVENTOR
LELAND E. WELLS
BY
ATTORNEY

United States Patent Office 2,786,090
Patented Mar. 19, 1957

2,786,090

ELECTROLYTE LEVEL CONTROL FOR A STORAGE BATTERY

Leland E. Wells, Philadelphia, Pa., assignor to The Electric Storage Battery Company, a corporation of New Jersey Application June 25, 1953, Serial No. 364,014

2 Claims. (Cl. 136—177)

The invention relates to devices for controlling or adjusting the level of electrolyte within the cells of storage batteries and, more particularly to the type of device that is adapted to adjust or main the electrolyte at different levels within the cell.

A general object of the invention is to provide means that will ensure that a battery is provided with that supply of electrolyte which is most suited for the temperatures to which the battery may be subjected during service. A further specific object is to provide such a device that will, in addition to ensuring a quantity of electrolyte commensurate with climatic conditions, positively and automatically prevent an oversupply thereof.

The temperatures to which storage batteries, particularly those designed for automotive service, may be subjected during life, may, and oftentimes do, range from extremely cold conditions, in the nature of zero degrees or even below, to very hot conditions of well over 100° F. As is well known to the industry, cold weather starting of engines requires, desirably, electrolyte of about 1.280–1.300 specific gravity. This high gravity electrolyte reacts with the active material of the plates to increase the high rate performance of the battery thereby bringing about a sudden peak surge of power to overcome engine sluggishness. On the other hand, in warmer climates or at other seasons of the year, no such sluggishness is encountered and the grave problem in battery service is maintaining a sufficient quantity of electrolyte so that evaporation of water from the cells will not cause the plates and separators to become exposed. For this type of service, a somewhat lower specific gravity electrolyte, in the nature of 1.240–1.260 is eminently satisfactory.

Devices have heretofore been known that are operable to control the level of electrolyte at one height within the cell, such height being generally a compromise between a low level giving a high gravity electrolyte for cold weather performance and a high level of lower specific gravity electrolyte for peak ambient temperature operation. In accordance with the present invention, however, means are provided whereby optimum battery operation can be obtained at either high temperatures or low temperatures.

Figure 1:
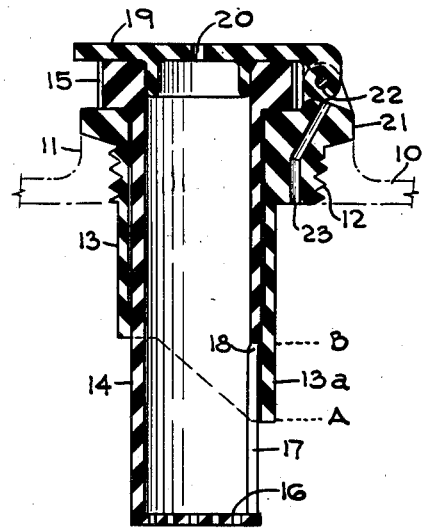
Figure 1 is a sectional view of a portion of a battery cell cover containing the invention arranged for winter or cold weather operation.

Referring now to the drawing, wherein like numerals are used to indicate like parts, a portion of a storage battery cell cover 10 contains an opening defined by walls 11, such walls being threaded internally as at 12 to receive first sleeve 13, threads 12 being adapted to co-act with threads formed on the external surface of sleeve 13.

The lower portion of first sleeve 13 contains a tapered portion 13a, the lowermost portion thereof being designated as A and the uppermost portion to which the taper extends being designated as B.

Figure 2:
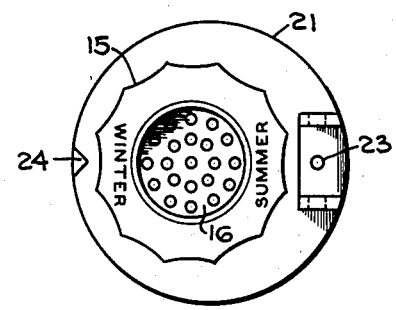
Figure 2 is a top plan view of Figure 1, vent cap 19 being removed for purposes of clarity.

A second sleeve 14 is provided within sleeve 13. Sleeve 14 is so constructed and arranged as to have a frictional fit within sleeve 13 and is rotatably positioned with respect thereto. An enlarged upper portion, such as is shown at 15, is provided on sleeve 14 and is adapted to make contact with the upper surface of sleeve 13 whereby sleeve 14 is supported therewithin. It should be understood, however, that this is merely a mechanical arrangement for supporting sleeve 14 and that such support can be brought about by coacting bead and groove arrangements on the respective sleeves or by any other suitable means which would serve to support said sleeve and yet permit rotation thereof relative to sleeve 13. As shown in Fig. 2 upper portion 15 of sleeve 14 may conventionally be knurled, scarified, or provided with other mechanical expedients for ease in rotating said sleeve.

The lower portion of sleeve 14 terminates in a perforated closure member 16 formed integrally with said sleeve. Vertical slot 17 in the wall of sleeve 14 extends upwardly from said closure member 16 to a point 18 located in the same plane as the uppermost point B of the tapered portion of sleeve 13.

Figure 3:
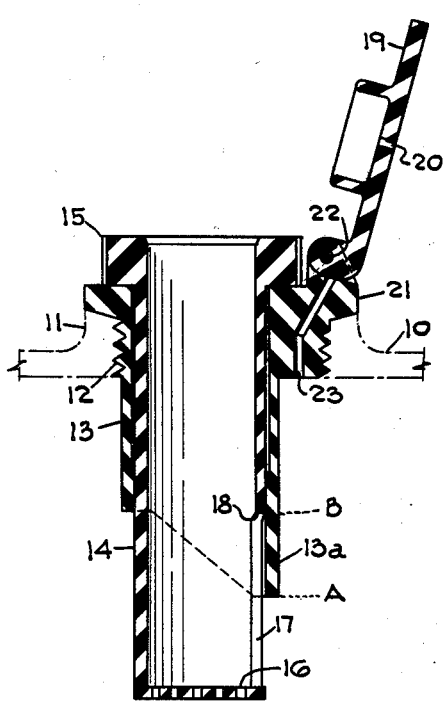
Figure 3 is a view similar to Figure 1 with the vent cap in position for addition of electrolyte.

Inner sleeve 14 is adapted to be closed at the upper end thereof by vent cap 19 containing vent opening 20. Vent cap 19 is affixed to an enlarged portion 21 of first sleeve 13 by means of hinge 22. Enlarged portion 21 of sleeve 13 is further provided with vent passage 23 which in the normal or closed position of vent cap 19 provides communication between the battery cell located under cover 10 and the atmosphere. As shown in Fig. 3 vent passage 23 is adapted to be sealed by the hinged portion of vent plug 19 when said vent plug is in an open or filling position.

The operation of the device is as follows: When it is desired to use the battery for cold weather operation, sleeve 14 is rotated until slot 17 is in the position shown in Fig. 1. This position can be shown by proper indicia on the top of sleeve 14 as indicated in Fig. 2 where the winter position of sleeve 14 is attained by turning said sleeve until indicator 24 points directly to the word "winter." In this position of sleeve 14, and when vent cap 19 is in the open position, water can only be added to the cell until the level thereof reaches point A on sleeve 13. Since vent passage 23 is sealed by vent plug 19, when the electrolyte level reaches point A there is no opening by which air or other gas can escape from the cell and any additional water that is added merely backs up within sleeve 14 thereby indicating that the cell is properly filled for winter operation. The filling operation is then stopped and vent plug 19 closed, thereby permitting air to escape through vent passage 23 and the excess electrolyte within sleeve 14 will then equalize itself throughout the cell.

Figure 4:
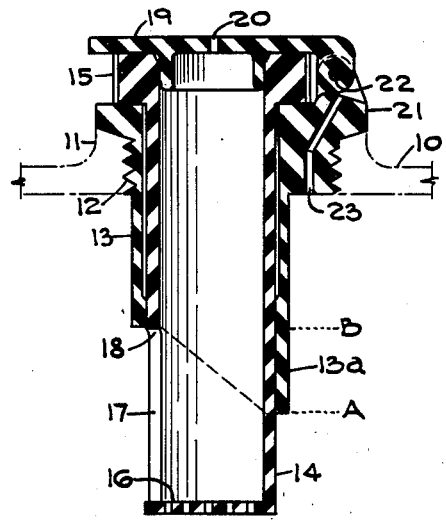
Figure 4 is a view similar to Figure 1, the invention being arranged for summer or warm weather operation.

If the battery is to be used under warm weather conditions, sleeve 14 is rotated until indicator 24 points to the proper indicia on the upper surface of said sleeve. At this point the arrangement of the sleeves will be as shown in Fig. 4. It will be noted that the entire length of slot 17 is now uncovered and that, therefore, electrolyte can be added until the level thereof rises to point B on sleeve 13, thereby providing the desirable high level of electrolyte for summer operation of the battery. At this point, since vent passage 23 is closed, water will back up within sleeve 14 as has been described in connection with cold weather operation above.

It will thus be seen that I have achieved the objects of the invention, namely, to provide a device which will control the electrolyte at different levels within a storage battery cell, such levels being dependent upon the temperature conditions to which the battery is subjected.

The specific embodiment of the invention and the particular description set forth are illustrative and given by way of example only. Other forms and variations coming within the scope of the appended claims will suggest themselves to those skilled in the art.

What is claimed is:

1. In a storage battery cell, means for controlling the electrolyte of said cell at different levels, comprising a first sleeve terminating in a tapered portion defining an opening extending from a lower level providing optimum electrolyte for low temperature operation of said battery cell to an upper level providing optimum electrolyte for high temperature operation of said cell; a slotted sleeve rotatably positioned within said first sleeve, said slot being adapted to register with said opening and extending for a substantial distance above and below the lower end of said first sleeve; a vent passage in said cell separate from said sleeves, and closure means normally associated with the upper end of said slotted sleeve and adapted for selectively sealing said slotted sleeve or said vent opening, said closure means closing said vent passage when in an open position.

2. The electrolyte level control means of claim 1 in which said closure means comprises a hinged vent cap frictionally associated with said slotted sleeve.

References Cited in the file of this patent

UNITED STATES PATENTS

| | | |
|---|---|---|
| 2,240,314 | Reppert et al. | Apr. 27, 1941 |
| 2,457,322 | Sandusky | Dec. 28, 1948 |
| 2,506,952 | Doughty | May 9, 1950 |